US012612250B2

(12) United States Patent
Kim

(10) Patent No.: US 12,612,250 B2
(45) Date of Patent: Apr. 28, 2026

(54) BATTERY MODULE TRANSFER JIG

(71) Applicant: LG ENERGY SOLUTION, LTD.,
Seoul (KR)

(72) Inventor: Tae Nam Kim, Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 435 days.

(21) Appl. No.: 18/035,823

(22) PCT Filed: Aug. 16, 2022

(86) PCT No.: PCT/KR2022/012196
§ 371 (c)(1),
(2) Date: May 8, 2023

(87) PCT Pub. No.: WO2023/022474
PCT Pub. Date: Feb. 23, 2023

(65) Prior Publication Data
US 2023/0399169 A1 Dec. 14, 2023

(30) Foreign Application Priority Data

Aug. 18, 2021 (KR) ........................ 10-2021-0108434

(51) Int. Cl.
B65G 1/04 (2006.01)
H01M 50/204 (2021.01)
(Continued)

(52) U.S. Cl.
CPC ............ B65G 1/04 (2013.01); H01M 50/204
(2021.01); H01M 50/256 (2021.01); H01M
50/258 (2021.01); B65G 2205/00 (2013.01)

(58) Field of Classification Search
CPC ....... B65G 1/04; B65G 13/12; H01M 50/256;
H01M 50/258; H01M 50/204
See application file for complete search history.

(56) References Cited

U.S. PATENT DOCUMENTS 3,549,025 A 12/1970 Messner
4,265,583 A 5/1981 Baird et al.
(Continued)

FOREIGN PATENT DOCUMENTS

CN 106740725 A 5/2017
CN 114803503 A 7/2022
(Continued)

OTHER PUBLICATIONS

Extended European Search Report for European Application No.
22858711.9, dated Apr. 18, 2024.
(Continued)

*Primary Examiner* — Kaitlin S Joerger
(74) *Attorney, Agent, or Firm* — Birch, Stewart, Kolasch
& Birch, LLP

(57) ABSTRACT

Discussed is a battery module transfer jig including a base
plate having mounted thereto a transfer roller configured to
transfer a battery module in a horizontal direction, a plurality
of guide rollers disposed at outer peripheries of opposite
sides of the base plate, a winch on the base plate and
configured to be coupled to the battery module that is loaded
in a battery module rack, the winch further being configured
to separate the battery module from the battery module rack,
and a mounting unit coupled to a lower part of the base plate,
wherein the battery module may be easily and safely sepa-
rated from the battery module rack, whereby it is possible to
improve work safety.

18 Claims, 3 Drawing Sheets

(51) Int. Cl.
  *H01M 50/256* (2021.01)
  *H01M 50/258* (2021.01)

(56) References Cited

U.S. PATENT DOCUMENTS

| | | | |
|---|---|---|---|
| 4,290,584 | A | 9/1981 | Eckels et al. |
| 2009/0139940 | A1 | 6/2009 | Maniscalco et al. |
| 2012/0068664 | A1 | 3/2012 | Franzen et al. |
| 2019/0315608 | A1 | 10/2019 | Dow et al. |
| 2020/0369497 | A1 | 11/2020 | Madsen |
| 2020/0385252 | A1 | 12/2020 | Zhang et al. |
| 2022/0111753 | A1 | 4/2022 | Zhang et al. |
| 2022/0111754 | A1 | 4/2022 | Zhang et al. |
| 2022/0111755 | A1 | 4/2022 | Zhang et al. |
| 2022/0336905 | A1 | 10/2022 | Jung et al. |
| 2023/0332941 | A1* | 10/2023 | Ttraverso ............. B65G 1/1371 |
| 2024/0409324 | A1* | 12/2024 | Kim .................... H01M 10/425 |

FOREIGN PATENT DOCUMENTS

| | | |
|---|---|---|
| CN | 119873177 A | 4/2025 |
| JP | 2004-214160 A | 7/2004 |
| JP | 2020-508930 A | 3/2020 |
| KR | 1998-078343 A | 11/1998 |
| KR | 10-2003-0071917 A | 9/2003 |
| KR | 10-2012-0014144 A | 2/2012 |
| KR | 10-2013-0102976 A | 9/2013 |
| KR | 10-2016-0081621 A | 7/2016 |
| KR | 10-2018-0109535 A | 10/2018 |
| KR | 10-2019-0017305 A | 2/2019 |
| KR | 10-2019-0105299 A | 9/2019 |
| KR | 10-2063906 B1 | 2/2020 |
| KR | 10-2020-0123349 A | 10/2020 |

OTHER PUBLICATIONS

International Search Report (PCT/ISA/210) issued in PCT/KR2022/012196, dated Nov. 16, 2022.
U.S. Office Action for U.S. Appl. No. 18/805,341, dated Jan. 12, 2026.

* cited by examiner

【FIG. 1】
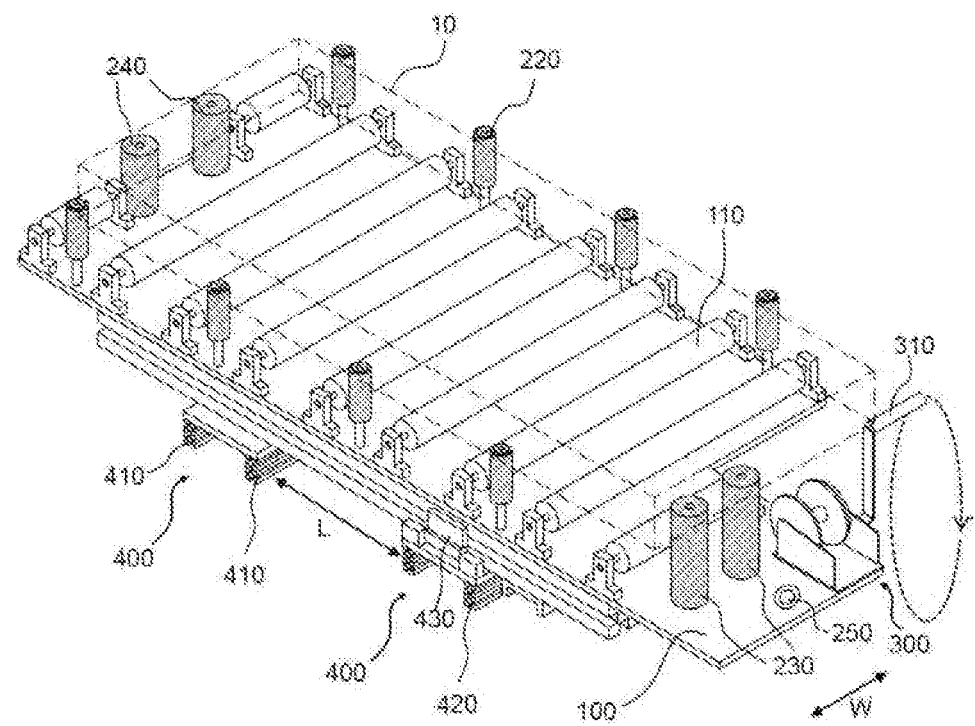
【FIG. 2】
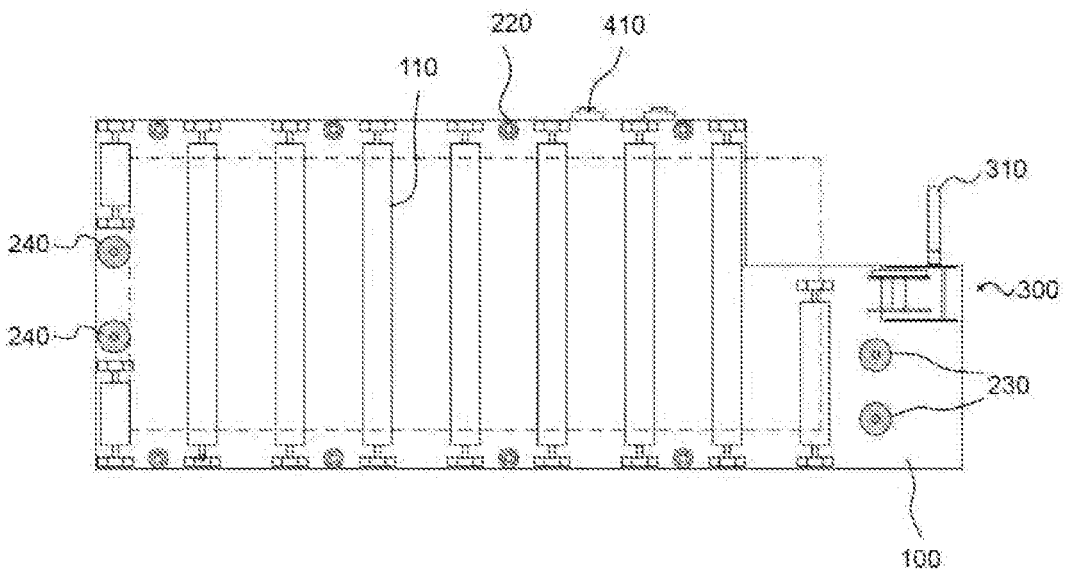

【FIG. 3】
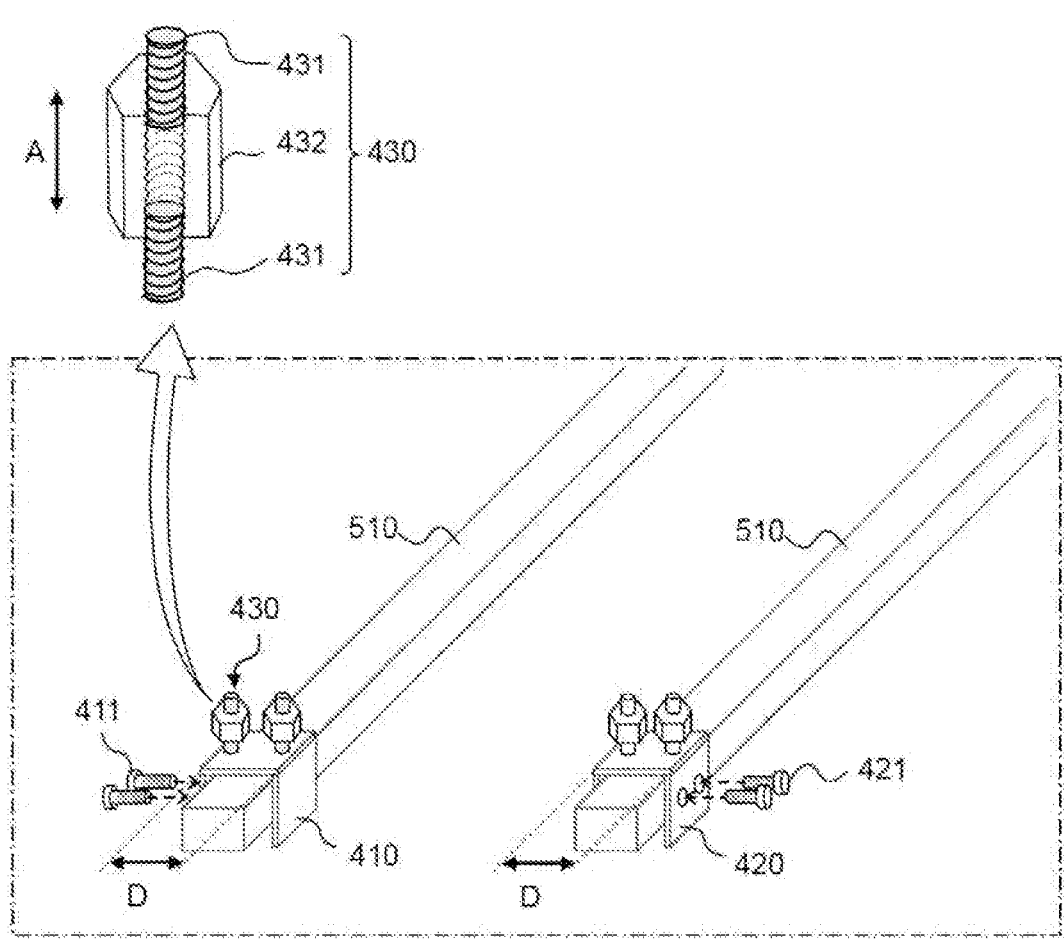

[FIG. 4]
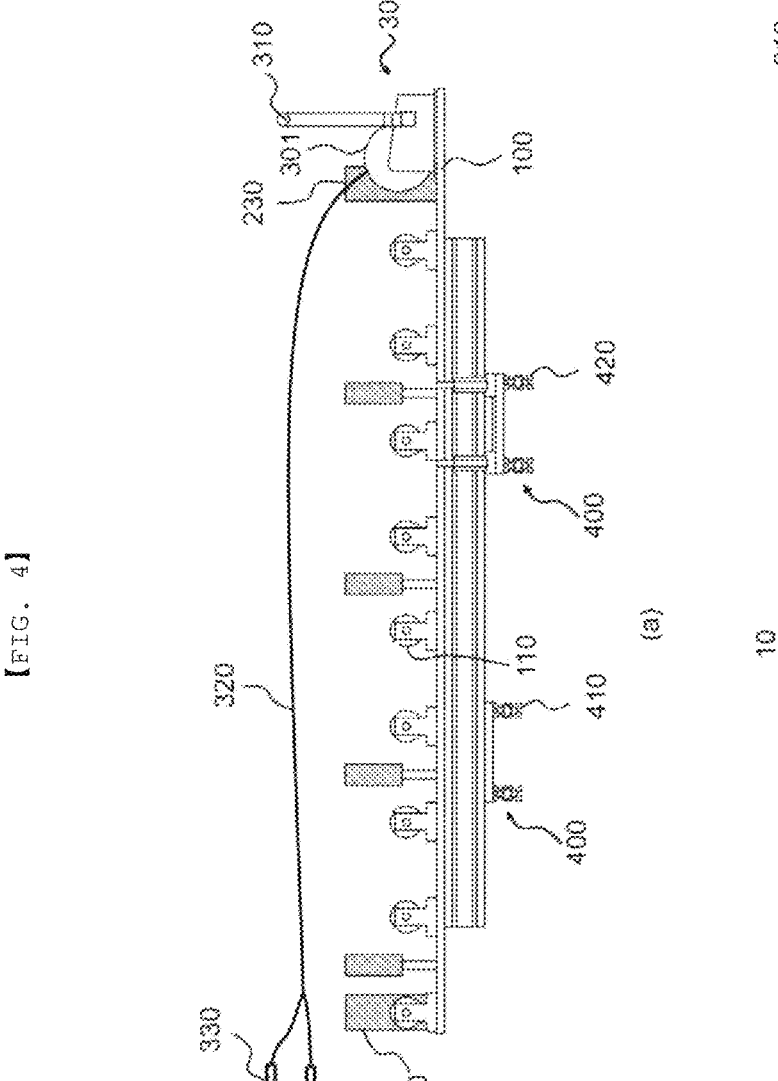
(a)
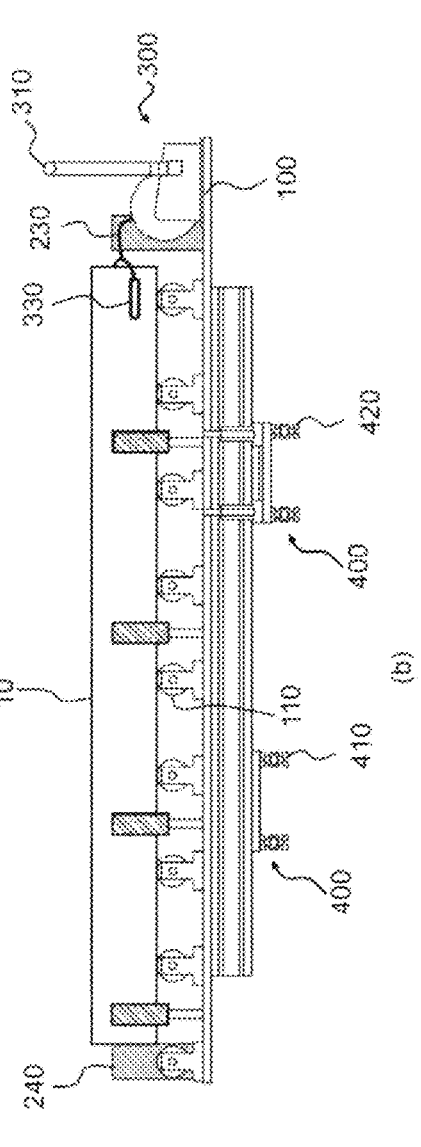
(b)

BATTERY MODULE TRANSFER JIG

TECHNICAL FIELD

This application claims the benefit of priority to Korean Patent Application No. 2021-0108434 filed on Aug. 18, 2021, the disclosure of which is incorporated herein by reference in its entirety.

The present invention relates to a battery module transfer jig. More particularly, the present invention relates to a battery module transfer jig capable of easily and safely separating battery modules from a battery module rack, thereby improving worker safety and work efficiency.

BACKGROUND ART

Interest in renewable energy as an alternative capable of satisfying carbon emission regulation and environmental pollution prevention has increased. For such renewable energy, which uses sunlight, wind force, etc., the amount of electric power produced varies depending on day and night or the intensity of wind, and the renewable energy is greatly affected by the natural environment.

Hence, an energy storage system (ESS) is used as an apparatus that stores excess electric power so as to be used when necessary. When the ESS is used, it is possible to stably supply electric power and to minimize blackout damage using an electric power distribution method.

The ESS may include a battery module including a lithium secondary battery as a power storage device, and a plurality of battery modules may be mounted and disposed in a battery module rack.

The height of the battery module rack may be up to a few meters. When the battery module is abnormal or maintenance, such as periodic inspection, is needed, therefore, it is necessary for a worker to separate the battery module from the battery module rack using a ladder.

The weight of one battery module may be changed depending on the size or capacity thereof. If the battery module is too heavy to be moved by the worker, however, there is a high risk of falling, and the work environment may be dangerous.

Accordingly, a method of installing a safe scaffold instead of the ladder may be considered. When the safe scaffold is installed in order to replace one battery module, however, work efficiency is reduced in terms of cost and time. In addition, when several battery modules are to be replaced, it is necessary to install several safe scaffolds or to move the safe scaffold. However, it takes much time to move the safe scaffold.

In connection therewith, Patent Document 1 relates to a system that replaces a battery of an unmanned transport vehicle, wherein the system includes a mounting/separation unit capable of separating the battery from the unmanned transport vehicle and transferring the separated battery into a storage space, but does not suggest an apparatus capable of separating a plurality of battery modules from a battery module rack.

Therefore, there is a need to develop a battery module transfer apparatus capable of securing safety of a worker and easily and rapidly transferring a battery module, thereby improving work efficiency.

PRIOR ART DOCUMENT (Patent Document 1) Korean Patent Application Publication No. 2012-0014144 (2012.02.16)

DISCLOSURE

Technical Problem

The present invention has been made in view of the above problems, and it is an object of the present invention to provide a battery module transfer jig capable of easily and safely transferring a heavy battery module and improving worker safety and work efficiency.

Technical Solution

A battery module transfer jig according to the present invention to accomplish the above object includes a base plate having mounted thereto a transfer roller configured to transfer a battery module in a horizontal direction, a plurality of guide rollers disposed at outer peripheries of opposite sides of the base plate, a winch on the base plate and configured to be coupled to the battery module that is loaded in a battery module rack, the winch further being configured to separate the battery module from the battery module rack, and a mounting unit coupled to a lower part of the base plate.

The winch may be provided at a front end of the base plate.

A front stopper may be mounted at a front end of the base plate corresponding to a rear of the winch.

A rear stopper mounting portion may be provided at a rear end of the base plate, and a rear stopper may be separably mounted to the rear stopper mounting portion.

The base plate may include a horizontal adjustment unit.

The mounting unit may include a screw configured to fix an arm of a lift.

The mounting unit further may include a first coupling portion and a second coupling portion configured to be positionally movable in a state of being coupled to the base plate.

The winch may be a manual winch, and the winch may include a handle.

The present invention provides a method of transferring a battery module using the battery module transfer jig. Specifically, the method includes mounting the battery module transfer jig to a lift, disposing the battery module transfer jig so as to be adjacent to a battery module to be separated from the battery module rack, coupling the winch of the battery module transfer jig to the battery module, and separating the battery module from the battery module rack using the winch.

The mounting may include a process of adjusting the position of the mounting unit of the battery module transfer jig so as to be aligned with a fastening portion of the lift and a process of adjusting a screw of a coupling portion of the mounting unit in order to fix the fastening portion to the coupling portion.

The separating may be performed as a process of a worker winding a wire of the winch to pull the battery module.

The method further may include a process of mounting a rear stopper to the base plate after the separating.

The method further may include a process of pushing the battery module so as to be loaded into the battery module rack.

In addition, the present invention may provide various combinations of the above solving means.

Advantageous Effects

As is apparent from the above description, a battery module transfer jig according to the present invention includes a coupling unit configured such that the position of the coupling unit is adjustable so as to correspond to the shape of a commercial vertical lift, whereby it is possible for the battery module transfer jig to be coupled to any type of lift, and therefore an application range thereof is increased.

In addition, the battery module transfer jig is configured to have a structure in which transfer rollers are mounted to a base plate configured to be movable in the state in which a battery module is loaded thereon, and therefore it is possible to easily slide a heavy battery module through the transfer rollers.

In addition, the battery module transfer jig includes a plurality of guide rollers. When the battery module is transferred in a state of being mounted to the base plate, therefore, it is possible to prevent separation of the battery module in an overall width direction of the battery module.

In addition, a stopper is mounted to each of a front end and a rear end of the base plate, whereby it is possible to prevent separation of the battery module in an overall length direction of the battery module, which is a direction in which the battery module is slid.

DESCRIPTION OF DRAWINGS

FIG. 1 is a perspective view of a battery module transfer jig according to the present invention.

FIG. 2 is a plan view of the battery module transfer jig of FIG. 1.

FIG. 3 is a perspective view of a coupling portion at which a coupling portion of the battery module transfer jig of FIG. 1 and a fastening portion of a lift are coupled to each other and a horizontal adjustment unit.

FIG. 4 is a side view of the battery module transfer jig of FIG. 1.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 1 is a perspective view of a battery module transfer jig according to the present invention, and FIG. 2 is a plan view of the battery module transfer jig of FIG. 1.

Referring to FIGS. 1 and 2, the battery module transfer jig includes a base plate 100 configured to allow a battery module 10 (indicated by a dotted line) to be loaded thereon, a plurality of guide rollers 220 configured to prevent separation of the battery module 10 from the base plate 100, a winch 300 configured to pull the battery module 10 so as to be loaded on the base plate 100, and a mounting unit 400 configured to fix the battery module transfer jig to a lift.

Specifically, a plurality of transfer rollers 110, configured to allow the battery module 10 to slide in a horizontal direction parallel to the ground so as to be loaded on the base plate 100, is mounted on the base plate 100. The transfer rollers 110 are configured to be rotated respectively about rotary shafts parallel to an overall width direction W of the base plate 100, and each of the transfer rollers may be configured to have a structure having low friction during rotation while being made of a material having low friction during rotation.

A battery module loaded in a battery module rack may have a ring structure configured to fix the winch 300. The winch 300 may be coupled to the ring of the battery module, and a wire of the winch may be wound to separate the battery module from the battery module rack.

The winch 300 may be a manual winch configured to be manually controlled by a worker. The winch may be disposed at a front end of the base plate adjacent to the location of the worker, and a handle 310 may be added to the winch.

While the battery module is transferred and loaded on the base plate, the battery module may be separated from the base plate if a movement direction of the battery module is not straight. In order to prevent such a problem, the plurality of guide rollers 220 is disposed at outer peripheries of opposite sides of the base plate 100.

Also, in order to prevent movement of the battery module to the front end or a rear end of the base plate 100 due to rotation of the transfer rollers, a front stopper 230 is provided at the front end of the base plate 100, and a rear stopper 240 is provided at the rear end of the base plate 100.

The battery module transfer jig according to the present invention is an apparatus that is mounted to a commercial lift and that is moved upwards to the battery module in the battery module rack to separate the battery module from the battery module rack. The mounting unit 400, which is configured to mount the battery module transfer jig to the lift, is coupled to a lower part of the base plate 100. The lift may be a vertical lift capable of moving upwards and downwards in addition to movement in the horizontal direction.

A method of transferring a battery module using the battery module transfer jig according to the present invention may include (a) a step of mounting the battery module transfer jig to a lift, (b) a step of disposing the battery module transfer jig so as to be adjacent to a battery module to be separated from a battery module rack, (c) a step of coupling the winch of the battery module transfer jig to the battery module, and (d) a step of separating the battery module from the battery module rack using the winch.

Specifically, step (a) is a process of adjusting the position of the mounting unit of the battery module transfer jig so as to be aligned with a fastening portion of the lift, and the distance L between mounting units 400 may be adjusted such that the mounting units 400 correspond in position to the fastening portion of the lift. For example, the mounting units include a first coupling portion 410 and a second coupling portion 420 configured to be positionally movable in a state of being coupled to the base plate.

In another embodiment, one of the two coupling portions coupled to the base plate, i.e. the first coupling portion and the second coupling portion, may be stationary, and the other coupling portion may be movable in a state of being coupled to the base plate such that the position thereof is adjusted.

FIG. 3 is a perspective view of a coupling portion at which the coupling portion of the battery module transfer jig of FIG. 1 and the fastening portion of the lift are coupled to each other and a horizontal adjustment unit.

Step (a) may include a process of adjusting a screw of the coupling portion in order to fix the fastening portion to the coupling portion. For example, after the battery module transfer jig (not shown) is seated on the lift, the screw may be tightened to adjust the width D of the first coupling portion 410 and the width D of the second coupling portion 420.

Referring to FIG. 3, the first coupling portion 410 and the second coupling portion 420 may include screws 411 and 421, respectively, in order to fix arms of the lift, as fastening portions 510 of the lift, to the first coupling portion 410 and the second coupling portion 420. Two screws 411 may be disposed side by side at the first coupling portion 410, and two screws 421 may be disposed side by side at the second coupling portion 420. Specifically, the screws 411 and 421 may be inserted through through-holes formed in the first coupling portion and the second coupling portion and may then be tightened in directions indicated by arrows to fix the fastening portions 510. In order to rotate the screws, each of the screws may include a knob formed at a head thereof.

When the battery module transfer jig is mounted to the arms of the lift, the part of the battery module transfer jig distant from a main body of the lift may droop due to the weight thereof. In order to compensate for such drooping of the battery module transfer jig, the base plate 100 may include a horizontal adjustment unit 430 and a level meter 250.

In the state in which the battery module transfer jig is mounted to the lift, the horizontal adjustment unit 430 may be adjusted to level a plane of the base plate while checking the level meter. For example, the level meter 250 may be a water level meter.

The horizontal adjustment unit 430 includes male screws 431 coupled to an upper part and a lower part of a hexagonal-pillar-shaped female screw 432, and the base plate is coupled to the male screw 431 located at the upper part of the female screw 432.

The A-direction length of the horizontal adjustment unit 430 may be adjusted while finely adjusting the female screw using a tool, such as a spanner. As described above, the base plate may be leveled by adjusting the A-direction length of the horizontal adjustment unit 430.

The lift is moved to the battery module rack in the state in which the battery module transfer jig is mounted to the lift, and the height of the lift is adjusted such that the battery module transfer jig is located in front of a battery module to be separated from the battery module rack.

Step (d) may be performed as a process of a worker winding the wire of the winch to pull the battery module. When the worker rotates the handle of the winch while holding the handle to wind the wire of the winch around the main body of the winch, the battery module may be transferred to the base plate. Since the handle of the winch is disposed adjacent to the location of the worker, it is possible to improve work efficiency.

FIG. 4 is a side view of the battery module transfer jig of FIG. 1.

Referring to FIG. 4, the winch 300 includes a main body 301 having a wire 320 wound therearound and a handle 310 configured to wind the wire 320, and the fixing portion 330, such as a ring, is coupled to an end of the wire 320.

(a) of FIG. 4 shows the state in which the wire 320 is withdrawn from the main body 301 before the battery module 10 is loaded on the battery module transfer jig, and (b) of FIG. 4 shows the state in which the battery module 10 has been transferred onto the transfer rollers 110.

A front stopper 230 is mounted at a front end of the base plate 100 at which the winch 300 is mounted, i.e., a rear of the winch 300. When the battery module 10 is moved to the front end of the base plate 100 in a state of being loaded on the battery module transfer jig, as shown in (b) of FIG. 4, movement of the battery module may be interrupted by the front stopper 230. Consequently, it is possible to prevent the battery module 10 from passing through the front end of the base plate 100 and thus from being separated from the base plate.

In addition, a rear stopper mounting portion may be provided at a rear end of the base plate 100, and a rear stopper 240 configured to be mounted to and separated from the rear stopper mounting portion may be separably mounted to the rear stopper mounting portion. After step (d), therefore, the rear stopper may be mounted to the rear stopper mounting portion to fix the position of the battery module.

(a) of FIG. 4 shows the state in which the rear stopper 240 is mounted for description although the battery module has not yet been loaded. The rear stopper 240 may be removed in order to transfer the battery module onto the transfer rollers 110, the battery module may be transferred onto the transfer rollers, and the rear stopper 240 may be mounted to the rear stopper mounting portion.

As described above, the front stopper and the rear stopper are coupled to the base plate, whereby it is possible to prevent separation of the battery module from the base plate due to rotation of the transfer rollers.

After the battery module is transferred through the above process, the state of the battery module is checked, and then the battery module is loaded into the battery module rack. For example, the lift may be moved upwards to transfer the battery module in front of the position of the battery module rack at which the battery module will be loaded, and the worker may push the battery module to the position of the battery module rack at which the battery module will be loaded, whereby it is possible to return the battery module to the original position thereof. At this time, the battery module may be easily moved to the original position thereof due to rotation of the transfer rollers.

When the battery module transfer jig and the battery module transfer method according to the present invention are used, as described above, it is possible to easily and safely transfer the battery module, and therefore it is possible to improve work efficiency and safety.

Those skilled in the art to which the present invention pertains will appreciate that various applications and modifications are possible within the category of the present invention based on the above description.

DESCRIPTION OF REFERENCE SYMBOLS

10: Battery module
100: Base plate
110: Transfer roller
220: Guide roller
230: Front stopper
240: Rear stopper
250: Level meter
300: Winch
301: Main body
310: Handle
320: Wire
330: Fixing portion
400: Mounting unit
410: First coupling portion
420: Second coupling portion
411, 421: Screws
430: Horizontal adjustment unit
431: Male screw
432: Female screw
510: Fastening portion
D: Width of first coupling portion, Width of second coupling portion
L: Distance between mounting units
W: Overall width direction of base plate

The invention claimed is:

1. A battery module transfer jig comprising:
a base plate having mounted thereto a transfer roller configured to transfer a battery module in a horizontal direction;
a plurality of guide rollers disposed at outer peripheries of opposite sides of the base plate;
a winch on the base plate and configured to be coupled to the battery module that is loaded in a battery module rack, the winch further being configured to separate the battery module from the battery module rack; and
a mounting unit coupled to a lower part of the base plate, wherein a front stopper is mounted at a front end of the base plate corresponding to a rear of the winch.

2. The battery module transfer jig according to claim 1, wherein the winch is provided at the front end of the base plate.

3. The battery module transfer jig according to claim 1, wherein a rear stopper mounting portion is provided at a rear end of the base plate, and
wherein a rear stopper is separably mounted to the rear stopper mounting portion.

4. The battery module transfer jig according to claim 1, wherein the base plate comprises a horizontal adjustment unit.

5. The battery module transfer jig according to claim 1, wherein the mounting unit comprises a screw configured to fix an arm of a lift.

6. The battery module transfer jig according to claim 5, wherein the mounting unit further comprises a first coupling portion and a second coupling portion configured to be positionally movable in a state of being coupled to the base plate.

7. The battery module transfer jig according to claim 1, wherein the winch is a manual winch, and
wherein the winch includes a handle.

8. A method of transferring the battery module using the battery module transfer jig according to claim 1, the method comprising:
mounting the battery module transfer jig to a lift;
disposing the battery module transfer jig so as to be adjacent to the battery module to be separated from the battery module rack;
coupling the winch of the battery module transfer jig to the battery module; and
separating the battery module from the battery module rack using the winch.

9. The method according to claim 8, wherein the mounting comprises:
a process of adjusting a position of the mounting unit of the battery module transfer jig so as to be aligned with a fastening portion of the lift; and
a process of adjusting a screw of a coupling portion of the mounting unit in order to fix the fastening portion to the coupling portion.

10. The method according to claim 8, wherein the separating is performed as a process of a worker winding a wire of the winch to pull the battery module.

11. The method according to claim 8, further comprising a process of mounting a rear stopper to the base plate after the separating.

12. The method according to claim 8, further comprising a process of pushing the battery module so as to be loaded into the battery module rack.

13. The method according to claim 10, wherein the winch is configured to wind the wire to pull the battery module towards the winch.

14. The battery module transfer jig according to claim 1, wherein the winch is configured to wind a wire to pull the battery module towards the winch.

15. The battery module transfer jig according to claim 1, wherein adjacent guide rollers of the plurality of guide rollers located on a first side of the opposite sides of the base plate are located an equal distance from each other.

16. The battery module transfer jig according to claim 15, wherein locations of guide rollers of the plurality of guide rollers located on a second side of the opposite sides of the base plate correspond to locations of guide rollers of the plurality of guide rollers located on the first side of the opposite sides of the base plate.

17. The battery module transfer jig according to claim 1, wherein a location of the front stopper overlaps a location of a rear stopper in a longitudinal direction of the base plate.

18. A battery module transfer jig comprising:
a base plate having mounted thereto a transfer roller configured to transfer a battery module in a horizontal direction;
a plurality of guide rollers disposed at outer peripheries of opposite sides of the base plate;
a winch on the base plate and configured to be coupled to the battery module that is loaded in a battery module rack, the winch further being configured to separate the battery module from the battery module rack; and
a mounting unit coupled to a lower part of the base plate, wherein the mounting unit comprises a screw configured to fix an arm of a lift.

* * * * *